(12) United States Patent
Brisebois et al.

(10) Patent No.: US 11,197,167 B2
(45) Date of Patent: *Dec. 7, 2021

(54) FACILITATION OF SELF-ADJUSTING NETWORK UPLINK NOISE BALANCING

(71) Applicant: AT&T Mobility II LLC, Atlanta, GA (US)

(72) Inventors: Arthur Richard Brisebois, Cumming, GA (US); Michael Stephens, Cumming, GA (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/919,988

(22) Filed: Jul. 2, 2020

(65) Prior Publication Data

US 2020/0336916 A1    Oct. 22, 2020

Related U.S. Application Data

(60) Continuation of application No. 15/962,108, filed on Apr. 25, 2018, now Pat. No. 10,743,187, which is a
(Continued)

(51) Int. Cl.
*H04W 72/00*    (2009.01)
*H04W 16/14*    (2009.01)
(Continued)

(52) U.S. Cl.
CPC ......... *H04W 16/14* (2013.01); *H04J 11/0066* (2013.01); *H04W 16/24* (2013.01);
(Continued)

(58) Field of Classification Search
None
See application file for complete search history.

(56) References Cited

U.S. PATENT DOCUMENTS

| 6,728,550 B1 | 4/2004 | Bohnke et al. |
| 6,735,451 B1 | 5/2004 | Jarleholm et al. |

(Continued)

OTHER PUBLICATIONS

Non-Final Office Action received for U.S. Appl. No. 13/686,742 dated May 16, 2014, 29 pages.
(Continued)

*Primary Examiner* — Suhail Khan
(74) *Attorney, Agent, or Firm* — Amin, Turocy & Watson, LLP

(57) ABSTRACT

Compensation is provided for foreign interference within a cell. Uplink (UL) noise on an UL channel to a first base station (BS) device is detected. Whether the UL noise includes interference is determined. Interference can include any device other than a mobile device configured to communicate with a BS device associated with a cell. The first service area of the BS device can be modified, e.g., scaled based on determining that the UL noise includes interference. Scaling can include reducing the first service area to a second service area that does not include an imbalance region in the first service area caused by the foreign interference. Scaling can be effected by reducing the amount of downlink power from the first BS device, or by adjusting a re-selection parameter associated with reducing the range of the BS device.

20 Claims, 11 Drawing Sheets

Related U.S. Application Data division of application No. 15/242,056, filed on Aug. 19, 2016, now Pat. No. 9,986,439, which is a continuation of application No. 14/874,954, filed on Oct. 5, 2015, now Pat. No. 9,445,376, which is a continuation of application No. 14/496,912, filed on Sep. 25, 2014, now Pat. No. 9,185,569, which is a continuation of application No. 13/686,742, filed on Nov. 27, 2012, now Pat. No. 8,874,127.

(51) Int. Cl.
| | |
|---|---|
| *H04W 36/20* | (2009.01) |
| *H04W 24/02* | (2009.01) |
| *H04W 52/14* | (2009.01) |
| *H04W 52/40* | (2009.01) |
| *H04W 72/04* | (2009.01) |
| *H04W 16/24* | (2009.01) |
| *H04W 36/30* | (2009.01) |
| *H04W 52/24* | (2009.01) |
| *H04J 11/00* | (2006.01) |
| *H04W 16/32* | (2009.01) |
| *H04W 72/08* | (2009.01) |

(52) U.S. Cl.
CPC ........... *H04W 16/32* (2013.01); *H04W 24/02* (2013.01); *H04W 36/20* (2013.01); *H04W 36/30* (2013.01); *H04W 52/143* (2013.01); *H04W 52/243* (2013.01); *H04W 52/40* (2013.01); *H04W 72/04* (2013.01); *H04W 72/0473* (2013.01); *H04W 72/082* (2013.01); *H04W 52/241* (2013.01)

(56) References Cited

U.S. PATENT DOCUMENTS

| | | | |
|---|---|---|---|
| 7,139,592 | B2 | 11/2006 | Leifer et al. |
| 2005/0122999 | A1* | 6/2005 | Scherzer ............ H04B 7/02 370/480 |
| 2005/0201351 | A1 | 9/2005 | Nakao |
| 2008/0125128 | A1 | 5/2008 | Yoo et al. |
| 2009/0310561 | A1 | 12/2009 | Grob et al. |
| 2009/0312017 | A1 | 12/2009 | Grob et al. |
| 2010/0177000 | A1 | 7/2010 | Brisebois et al. |
| 2011/0086614 | A1 | 4/2011 | Brisebois et al. |
| 2011/0319084 | A1 | 12/2011 | Meshkati et al. |
| 2013/0237227 | A1 | 9/2013 | Nagaraja et al. |

OTHER PUBLICATIONS

Non-Final Office Action received for U.S. Appl. No. 14/496,912 dated Dec. 12, 2014, 16 pages.
Final Office Action received for U.S. Appl. No. 14/496,912 dated Mar. 19, 2015 13 pages.
Notice of Allowance received for U.S. Appl. No. 14/874,954 dated May 16, 2016, 35 pages.
Non-Final Office Action received for U.S. Appl. No. 15/962,108 dated Apr. 16, 2019, 40 pages.
Final Office Action received for U.S. Appl. No. 15/962,108 dated Jul. 31, 2019, 16 pages.
Non-Final Office Action received for U.S. Appl. No. 15/962,108 dated Nov. 27, 2019, 35 pages.

\* cited by examiner

FACILITATION OF SELF-ADJUSTING NETWORK UPLINK NOISE BALANCING

CROSS-REFERENCE TO RELATED APPLICATIONS

The subject application is a continuation of, and claims priority to each of, U.S. patent application Ser. No. 15/962,108, filed Apr. 25, 2018, and titled "FACILITATION OF SELF-ADJUSTING NETWORK UPLINK NOISE BALANCING," which is a divisional of U.S. patent application Ser. No. 15/242,056 (now issued as U.S. Pat. No. 9,986,439), filed Aug. 19, 2016, and titled "FACILITATION OF SELF-ADJUSTING NETWORK UPLINK NOISE BALANCING," which is a continuation of U.S. patent application Ser. No. 14/874,954 (now issued as U.S. Pat. No. 9,445,376), filed Oct. 5, 2015, and titled "FACILITATION OF SELF-ADJUSTING NETWORK UPLINK NOISE BALANCING," which is a continuation of U.S. patent application Ser. No. 14/496,912 (now issued as U.S. Pat. No. 9,185,569), filed Sep. 25, 2014, and titled "FACILITATION OF SELF-ADJUSTING NETWORK UPLINK NOISE BALANCING," which is a continuation of U.S. patent application Ser. No. 13/686,742 (now issued as U.S. Pat. No. 8,874,127), filed Nov. 27, 2012, and titled "FACILITATION OF SELF-ADJUSTING NETWORK UPLINK NOISE BALANCING," the entireties of each of which applications are hereby incorporated by reference herein.

TECHNICAL FIELD

The subject disclosure relates to wireless communications and, also generally, to various embodiments that facilitate uplink noise balancing via self-adjusting networks.

BACKGROUND

Frequency division duplex wireless networks use separate yet paired spectrum for uplink and downlink communication. Reception on the uplink is important for a number of reasons including, but not limited to, transmission of user data from the mobile device to another destination, and signaling and call maintenance functions impacting both uplink and downlink paths. For example, radio link access, quality feedback, transmission control protocol (TCP) and flow control feedback, failure timers and handover are all dependent upon uplink reception at the BS device, even in cases in which the majority of content is transmitted and/or received over the downlink.

Additionally, inadequate uplink reception can result in call drops (even in cases in which the downlink is ideal) and call setup accessibility impacts. Call setup accessibility impacts can be severe because, a mobile device may camp on the best cell from a downlink perspective without any indication as to whether the uplink is adequate for call setup. As such, if the uplink is or becomes impaired, the network may not receive uplink call setup requests from the mobile device.

DETAILED DESCRIPTION

Figure 1:
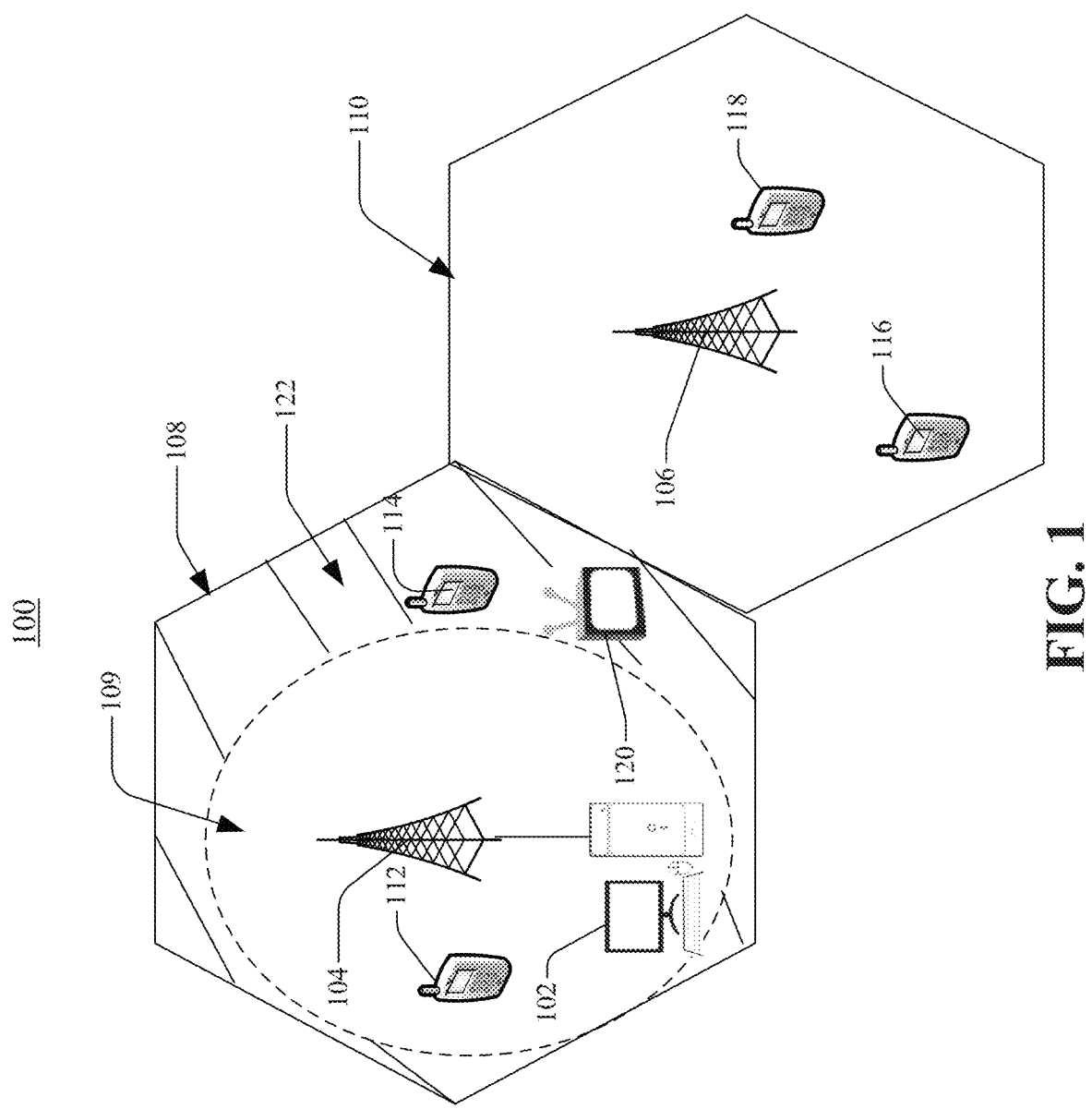
FIG. 1 illustrates an example system in which uplink noise balancing can be facilitated in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "mobile device," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell carrier" are used interchangeably, and the terms "macro" and "macrocell carrier" are used interchangeably.

The mobile device transmit power on the uplink can be limited by device form factor, battery power and/or device radiation exposure limits. As such, BS device receivers are typically designed to have high sensitivity and include complex diversity, combining and interference cancellation techniques. In spite of these techniques and designs, BS device receivers may still be impacted by foreign uplink interference sources that raise the uplink received noise floor. This uplink interference can be especially problematic for 700 megahertz (MHz) LTE carriers, which may use spectrum vacated by high power ultra high frequency (UHF) television transmitters. Typical sources of 700 MHz uplink interference includes, but is not limited to, television transmitters, broadcast video (e.g., MediaFLO), faulty cable television systems, faulty fluorescent lighting components, wireless microphones, intermodulation effects caused by co-location of high power 1900 MHz transmitters, 850 MHz transmitters, adaptive wireless solution (AWS) transmitters and 700 MHz transmitters.

With an elevated noise floor, the BS device may be unable to decode uplink transmissions from mobile devices located at the cell edge, thus increasing the likelihood of poor performance and dropped calls. An elevated noise floor can also cause the mobile device power to rise faster than normal, thus impacting battery life of the mobile device and causing uplink interference for neighboring BS devices. Finally, in the most extreme cases, an elevated noise floor can cause a BS device to collect idle mode mobile devices in areas in which call setup is not possible due to jammed receivers. In this case, a mobile device may not be able to make a call.

BS device interference cancellation techniques can employ de-correlated receive antenna pairs to detect and cancel uplink interference from various sources. Unfortunately these techniques also use receive diversity antenna pairs for interference cancellation and receiver diversity link budget gains may be lost.

Traditional uplink interference detection techniques measure wideband or channelized noise without any intelligence about the source of the noise. As such, uplink interference may be falsely reported due to normal user traffic in the area. Such false reporting can have a significant impact on LTE systems since a single mobile device can occupy large portions of the total uplink spectrum for extended periods in order to maximize throughput and minimize latency, and shutdown of sectors can occur as a result of false reporting.

LTE-Advanced asymmetrical carrier aggregation and asymmetrical carrier interference avoidance can allow for the active mode use of downlink resources from LTE carriers with impaired or no uplink radio paths. For example, the uplink impaired carriers can be used as downlink-only component carriers that are used only in tandem with symmetrical anchor carriers. The uplink traffic and control can be steered towards the anchor carrier and away from the uplink impaired component carrier. Unfortunately this technique is only used in the active mode. As such, it is still possible for an idle mode mobile device to camp on an LTE carrier that is unable to process call setup requests from the mobile device in the uplink direction due to interference.

Various embodiments described herein can automatically detect, adapt to and/or mitigate the effects of foreign uplink interference in frequency division duplex wireless networks. Specifically, systems and methods described herein can proactively identify foreign uplink interference and scale the service area of a BS device to mitigate the risk of impaired uplink for active mode and idle mode mobile devices. While correction can be applied for LTE systems, in other embodiments, the systems and methods of correction described herein can be applied for any frequency division duplex technology. In one or more embodiments, a method can include: detecting, at a system comprising a processor, uplink noise on an uplink channel to a first base station device; determining, by the system, whether the uplink noise includes foreign interference, wherein the foreign interference comprises interference from a device that operates outside of a communication system within which the first base station device operates; and modifying, by the system, a first service area of the first base station device based on determining that the uplink noise includes foreign interference, wherein the modifying comprises reducing the first service area to a second service area by excluding a portion of an imbalance region in the first service area, wherein the imbalance region is a region determined to have satisfied an imbalance criterion. In some embodiments, the imbalance criterion can mean an area of the cell exists from which communications from the first base station device can be reliably received while communications to the first base station device (from the same area) cannot be reliably received.

In one or more embodiments, a computer-readable storage medium can store computer-executable instructions that, in response to execution, cause a system comprising a processor to perform operations. The operations can include: detecting uplink noise on an uplink channel of a first one of a plurality of base station devices; determining that the uplink noise includes foreign interference from a source other than a mobile device served by any of the plurality of base station devices; and reducing a coverage area of the first one of the plurality of base station devices to exclude an imbalance region, wherein the imbalance region is a region determined to have become imbalanced as a result of the foreign interference based on an evaluation of an imbalance criterion.

In one or more embodiments, a system can include a memory that stores computer-executable instructions, and a processor, communicatively coupled to the memory, that facilitates execution of computer-executable instructions to perform operations comprising: detecting uplink noise on an uplink channel to a first base station device; determining whether the uplink noise includes interference from a source other than a mobile device; and modifying a first service area of the first base station device based on determining that the uplink noise includes interference from the source, wherein the modifying comprises reducing the first service area to exclude an imbalance region in the first service area, wherein the imbalance region is a region determined to have satisfied an imbalance criterion.

One or more embodiments can detect excess uplink interference and enable continued use of an impaired cell associated with a BS device over a reduced service area until the excess uplink interference problem is resolved. Additionally, in one or more embodiments, the systems and methods can increase the likelihood that idle mode mobile devices only camp on a cell having a BS device that is generally able to decode uplink transmissions (e.g., call setup requests) from the mobile device. Finally, in one or more embodiments, the systems and methods can allow the full use of downlink resources and power for LTE-Advanced carrier aggregation in the active mode yet reduce the likelihood of use of an uplink impaired cell in the idle mode.

FIG. 1 is an example system 100 in which processing for uplink noise balancing can be facilitated in accordance with embodiments shown. The system 100 can include an uplink noise balancing system 102, a plurality of BS devices 104, 106 configured to serve service areas 108, 110, respectively, one or more mobile devices 112, 114, 116, 118 and a foreign noise source 120. BS device 104 is associated with cell 108 and serves mobile devices 112, 114, while BS device 106 is associated with cell 110 and serves mobile devices 116, 118. In the embodiments described, the system 100 can provide service to active mode and idle mode mobile devices.

As used herein, the foreign noise source 120 can be any device other than the mobile devices served by the BS device 104 (e.g., mobile devices 112, 114) and served by other BS devices (e.g., BS device 106) (e.g., mobile devices 116, 118). For example, the foreign noise source 120 can include, but is not limited to, devices that transmit and/or receive information on spectrum vacated by UHF television transmitters (e.g., analog television transmitters), broadcast video (e.g., MediaFLO), faulty cable television systems, faulty fluorescent lighting components, wireless microphones, intermodulation effects caused by co-location of high power 1900 MHz transmitters, 850 MHz transmitters, adaptive wireless solution (AWS) transmitters and/or 700 MHz transmitters.

The interference contributed to the uplink channel to a BS device (e.g., BS device 104) from the foreign noise source 120 can be considered to be foreign interference in various embodiments. As such, an uplink noise balancing system 102 determining whether foreign interference exists can determine whether interference on an uplink to the BS device appears to include interference from the foreign noise source 120.

The uplink noise balancing system 102 can be electrically and/or communicative coupled to the BS devices 104, 106 in various embodiments. However, in some embodiments, the uplink noise balancing system 102 can be included as a part of (and be located at) one or more of BS devices 104, 106. In some embodiments, each BS device 104, 106 can include an uplink noise balancing system having structure and/or functionality such as that described herein for uplink noise balancing system 102.

The uplink noise balancing system 102 can detect uplink noise experienced on the uplink channel by the BS devices 104, 106. The uplink noise can be detected as a result of communications on the uplink from the mobile devices 112, 114, 116, 118 and as a result of information transmitted from (or broadcast from) the foreign noise source 120. As such, the uplink noise detected by the uplink noise balancing system 102 can include foreign interference in some embodiments.

In some embodiments, the foreign interference can result in excessive uplink noise. In some embodiments, excessive uplink noise can be uplink noise that is greater than or approximately equal to a defined value, which can change from time to time and/or be constant value pre-programmed during the configuration of the BS device 104. For example, the defined value can be adjusted based on the time of day, day of month, month of year, current and/or historical traffic conditions and/or current or historical mobile device interference.

In some embodiments, however, excessive uplink noise can be uplink noise having a value that reduces an uplink service area of the BS device 104 to a region that is less than a downlink service area for the BS device 104. The uplink service area of the BS device 104 can be the service area over which the BS device 104 can successfully receive uplink transmissions (e.g., uplink call setup requests) at a defined reliability. The downlink service area of the BS device 104 can be the service area over which a mobile device (e.g., mobile device 112, 114) can successfully receive downlink transmissions at a defined reliability. The defined reliability values for the uplink and the downlink can be any suitable value as dictated by the designer of system 100.

Because the uplink noise can be excessive enough to have a value that reduces an uplink service area of the BS device 104 to a region that is less than a downlink service area for the BS device 104, an imbalance region 122 exists in the gap between the uplink service area and the downlink service area for the BS device 104.

For example, with reference to FIG. 1, BS device 104 can have a downlink service area of service area 108 and uplink service area of 109. As such, the imbalance region 122 can be formed and mobile devices (e.g., mobile device 114) may have a low likelihood of having successful uplink transmissions that the BS device 104 is able to decode. Accordingly, call setup requests, for example, may not be successfully received by the BS device 104 from mobile device 114.

To address this imbalance between the uplink and the downlink reception, the uplink noise balancing system 102 can cause the BS device 104 to adjust downlink power, and/or cause re-selection parameters to be broadcast to reduce the range of the BS device 104, such that mobile device 114 performs handover to or re-selects a new cell (e.g., cell 110). In various embodiments, the uplink noise balancing system 102 can also cause the BS device 106 to adjust downlink power and/or re-selection parameters broadcast to reduce the likelihood that a mobile device that re-selects to cell 110 will not immediately re-select back to cell 108 upon the broadcast of re-selection parameters and/or adjustment of downlink power from BS device 106. Accordingly, a coordinated effort that takes into account a BS device and a neighboring BS device can be employed as described with greater detail with reference to FIG. 2.

Figure 2:
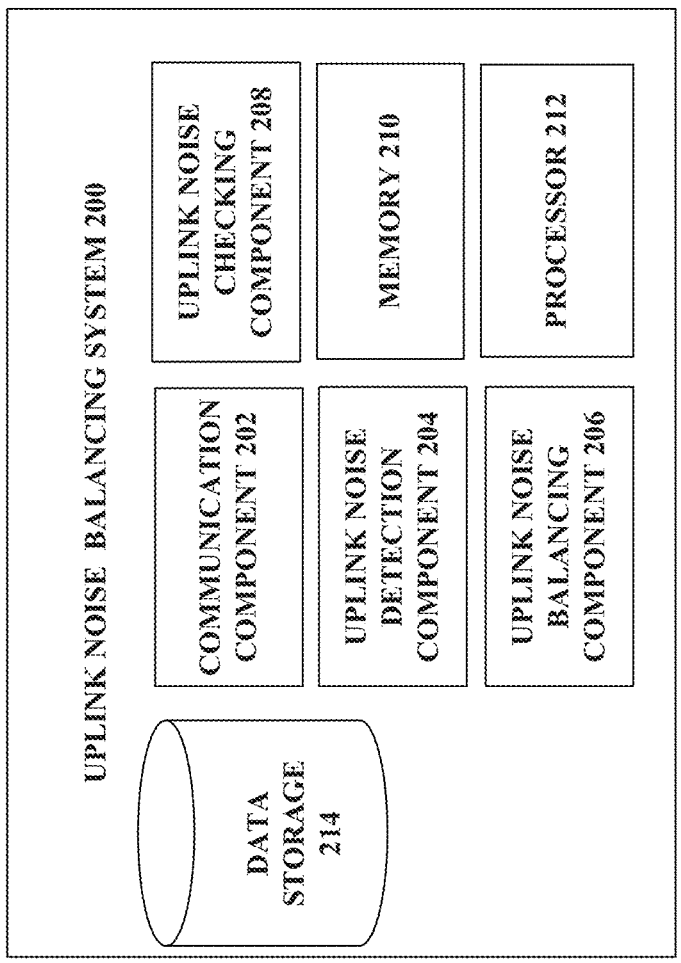
FIG. 2 illustrates an example system that facilitates processing for uplink noise balancing in accordance with embodiments described herein.
Figure 3:
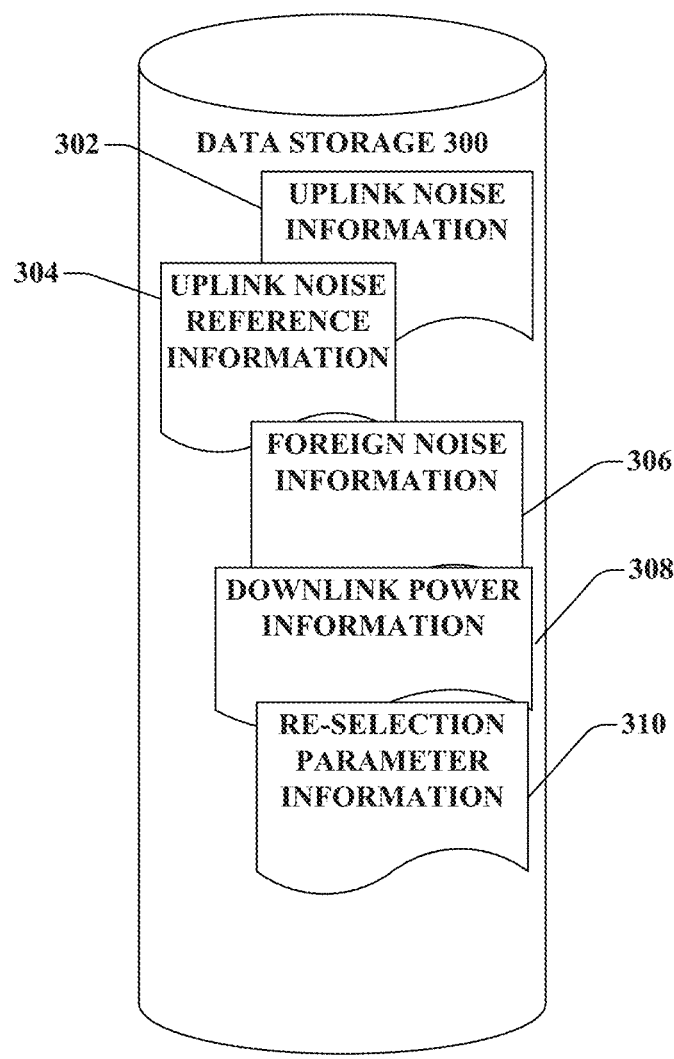
FIG. 3 illustrates an example data storage that facilitates processing for uplink noise balancing in accordance with embodiments described herein.

The uplink noise balancing system 102 will be described in greater detail with reference to FIGS. 2, 3, 4A, 4B and 4C. FIG. 2 illustrates an example system that facilitates processing for uplink noise balancing in accordance with embodiments described herein. FIG. 3 illustrates an example data storage (e.g., data storage 300) that facilitates processing for uplink noise balancing in accordance with embodiments described herein.

Turning first to FIGS. 2 and 3, the uplink noise balancing system 200 can include a communication component 202, an uplink detection component 204, an uplink noise balancing component 206, an uplink noise checking component 208, a memory 210, a processor 212 and/or data storage 214.

In some embodiments, one or more of the communication component 202, an uplink detection component 204, an uplink noise balancing component 206, an uplink noise checking component 208, a memory 210, a processor 212 and/or data storage 214 can be electrically and/or communicatively coupled to one another to perform one or more functions of the uplink noise balancing system 200.

In various embodiments, one or more of the structure and/or functionality of uplink noise balancing system 200 can be or include the structure and/or functionality of uplink noise balancing system 102 described with reference to FIG. 1 (and vice versa).

The communication component 202 can transmit and/or receive information to and/or from a BS device (e.g., BS device 104 described and shown with reference to FIG. 1) and/or to one or more mobile devices served by the BS device 104. For example, the communication component 202 can transmit noise balancing information generated by the uplink noise balancing system 102. The information can include, but is not limited to, adjusted downlink power level information (or information for performing adjustment of the downlink power level at the BS device), and/or re-selection parameter values for broadcast to mobile devices (or information for performing adjustment of the re-selection parameter values).

In various embodiments, the communication component 102 can receive information indicative of uplink signals received at a BS device. For example, the communication component 102 can receive information that can be employed by the uplink noise balancing system 200 to determine the uplink noise and whether the uplink noise includes foreign interference from a foreign noise source (e.g., foreign noise source 120).

By way of example, but not limitation, the foreign noise source 120 can include, but is not limited to, noise from sources other than mobile devices served by the BS devices, noise from devices that transmit and/or receive information on spectrum vacated by UHF television transmitters (e.g., analog television transmitters), broadcast video (e.g., MediaFLO), faulty cable television systems, faulty fluorescent lighting components, wireless microphones, intermodulation effects caused by co-location of high power 1900 MHz transmitters, 850 MHz transmitters, adaptive wireless solution (AWS) transmitters and/or 700 MHz transmitters.

The uplink noise detection component 204 can detect or determine the uplink noise on the uplink channel to the BS device (e.g., BS device 104). While embodiments described herein may refer to "uplink noise," in different embodiments, the average uplink noise can be determined and employed to perform the uplink noise balancing systems and/or methods described herein.

In various embodiments, the uplink noise detection component 204 can determine whether the uplink noise includes a contribution from a foreign noise source. For example, in some embodiments, the uplink noise detection component 204 can compare the amount of uplink noise to an uplink noise reference value. If the uplink noise is greater than or equal to the uplink noise reference value, the uplink noise detection component 204 can determine that the uplink noise includes a contribution from a foreign noise source.

In various embodiments, the uplink noise reference value can be determined by the uplink noise detection component 204 and/or by the BS device associated with a cell by historical information about the uplink noise obtained by past monitoring of mobile devices in the served and neighboring cells. As such, the uplink noise reference value can be updated from time to time as traffic conditions change and/or during different times of day, days of week and/or days of month or year when the uplink noise reference value typically changes. In various embodiments, employing historical information can reduce the likelihood of erroneously determining that foreign interference exists when the noise is resultant from mobile devices for the cell and/or for neighboring cells.

In some embodiments, prior to determining whether the uplink noise includes a contribution from a foreign noise source, the uplink noise detection component 204 can filter the uplink noise. In some embodiments, the uplink noise detection component 204 can filter the uplink noise by any number of different methods.

In one embodiment, the uplink noise detection component 204 can filter the uplink noise by aggregating uplink noise reports during idle Transmission Time Interval (TTI). Idle TTI can be TTI for which there have been no uplink grants for resources (e.g., a physical resource block (PRB) associated with a cell). Idle TTI information is likely to be available due to the bursty nature of uplink wireless data traffic. However, if idle TTI information is not available, the uplink noise detection component 204 can artificially generate idle TTI by declining uplink grants for brief time intervals.

The uplink noise detection component 204 can trigger the generation of artificially idle intervals periodically and/or based on the occurrence of a condition. For example, the uplink noise detection component 204 can trigger the generation of artificially idle intervals based on receipt of information indicating an increase in uplink noise (or an increase in average uplink noise).

In one embodiment, the uplink noise detection component 204 can filter the uplink noise of mobile devices served on a neighboring cell by monitoring load indication messages (e.g., X2 load indication messages) from known neighboring BS devices. For example, load indication messages typically employed for Inter Cell Interference Coordination (ICIC) can be employed.

The uplink noise detection component 204 can employ the ICIC messages to determine if mobile devices for neighboring cells exist. In some embodiments, uplink noise measurements are included in the uplink noise average only if the serving BS device detects idle TTI (e.g., no served mobile devices are active) and the load indicator messages from all neighboring BS devices are below a defined value that indicates that no neighboring mobile devices are active.

As before, if random burstiness does not provide adequate idle samples for reliable uplink noise filtering (and subsequent measuring), the uplink noise detection component 204 can coordinate artificial blank TTI in which one or more (or all) grants are declined by the BS device and the neighboring BS devices. This mechanism can reuse X2 interference coordination mechanisms to trigger artificial idle TTI for a BS device and all neighboring BS devices.

If the uplink noise (or, in some embodiments, the average of the uplink noise) is greater than or equal to the uplink noise reference value, the uplink noise detection component 204 can determine that a foreign noise source is contributing to the uplink noise received by the BS device. If the uplink noise (or, in some embodiments, the average of the uplink noise) is less than the uplink noise reference value, the uplink noise detection component 204 can determine that a foreign noise source is not contributing to the uplink noise received by the BS device.

In some embodiments, the uplink noise detection component 204 can determine whether the uplink noise has a contribution from a foreign noise source by evaluating the pattern or other characteristics of the uplink noise. For example, uplink noise measurements can average ~–116 dBm in some embodiments. With this uplink noise and full downlink power from the BS device, the uplink noise detection component 204 can determine that the uplink and downlink paths of the cell are balanced because the uplink and downlink service areas are substantially equal.

However, if the uplink noise rises above the uplink noise reference value, the uplink service area will be less than the downlink service area. For example, if the uplink noise or the uplink average noise is –110 dB, the uplink service area will be approximately 6 dB smaller than the downlink service area. As such, there will be a 6 db band of downlink coverage for which uplink coverage is inadequate or non-existent. The 6 dB band of coverage can be the imbalance region 122 of FIG. 1. A BS device for the cell may not be able to receive transmissions from a mobile device in the imbalance region. Further, leaving the uplink impaired cell at full power can add unnecessary downlink interference and dropped call risk for the cell.

In order to eliminate and/or reduce the imbalance region in cases in which the cells are non-aggregated, the uplink noise detection component 204 can trigger a power attenuation alarm. In response to the alarm, the uplink noise balancing component 206 can reduce downlink coverage by 6 dB.

Downlink coverage can be reduced via automatic power reduction by an amount based upon the rise in the uplink noise (or average uplink noise). For example, the downlink power can be automatically reduced by the same number of dB as the noise rise above the uplink noise reference value (or the average uplink noise rise above the uplink noise reference value). Cell power can automatically return to normal after the noise source is eliminated.

As another example, if the uplink noise includes a stable noise source for a defined amount of time (e.g., 5 minutes, 10 minutes), the uplink noise detection component 204 can determine that a foreign noise source exists as a foreign noise source is likely to appear as uplink noise to the BS device for the entirety of the time that the foreign noise source is powered on.

With reference to FIG. 3, the uplink noise detected and/or information indicative of the uplink noise detected can be stored in the uplink noise information 302 stored in data storage 300. Information about the foreign noise can be stored as foreign noise information 306, and the uplink noise reference value and/or the defined amount of time that a stable noise is detected by the BS device for determination that a foreign noise source exists can be stored as uplink noise reference information 304 in the data storage 300.

Turning back to FIG. 2, the uplink balancing component 206 can balance a cell such that the number of mobile devices in the imbalance region is zero or reduced relative to a number of mobile devices in the imbalance region prior to detection of the imbalance region. The uplink balancing component 206 can scale the service area of a BS device with an imbalance region based on the determination by the uplink noise detection component 204 that the uplink noise detected includes foreign interference. For example, the uplink balancing component 206 can reduce the service of the BS device to exclude one or more portions of the imbalance region in some embodiments.

To scale the service area of the BS device, the uplink balancing component 206 can cause the reduction of downlink power and/or adjustment of re-selection parameter values. The approach employed can be based on whether the cells are aggregated or non-aggregated.

In systems in which the cells are not aggregated (and the system serves full duplex traffic for the entire service area), to scale the service area of the BS device, the uplink balancing component 206 can cause the BS device to reduce the downlink power from the BS device by a particular amount and/or to a particular power level. The amount by which the downlink power is reduced can be approximately equal to the amount by which the uplink noise (or the average uplink noise) exceeds the uplink noise reference value for example.

For example, if the uplink noise (or the average uplink noise) exceeds the uplink noise reference value by 6 dBm, the uplink balancing component 206 can generate information to cause the BS device to reduce the downlink power from the BS device by approximately 6 dB. With reference to FIG. 3, the first and/or second downlink power values and/or equations for or information associated with reducing downlink power can be stored as downlink power information 308 of data storage 300.

In some embodiments, adjustment of the downlink power from the BS device can be employed in systems in which carrier aggregation (e.g., LTE-Advanced carrier aggregation) is not employed while adjustment to re-selection parameters can be employed in systems in which carrier aggregation is employed.

Turning back to FIG. 2, in another embodiment, if the cells are aggregated, asymmetrical and, in some cases, simplex carriers can be employed for the downlink only. In the active mode, a cell having an imbalance region can be used as a downlink-only component carrier as long as a path-balanced anchor carrier is available to handle duplex (or perhaps even uplink-only) transmission and reception. In this case, downlink power reduction can balance the uplink and the downlink paths by reducing the size of the effective downlink service area and throughput. This cost can be avoided or the likelihood of experiencing such cost can be reduced by using the non-impaired anchor carrier (e.g., the anchor carrier that does not have an imbalance region) for the uplink transmissions, and using a full power (yet uplink-impaired) carrier for the downlink transmissions. This can provide a higher active mode carrier aggregation benefit in the downlink channel.

However, in order to reduce the risk of an idle mode mobile device camping on an uplink-impaired cell (e.g., a cell having an imbalance region), the uplink balancing component 206 can adjust the value of one or more re-selection parameters to cause the idle mode mobile devices in the imbalance region to re-select away from the impaired cell towards a non-impaired cell.

As such, in some embodiments, the re-selection parameters broadcast can be idle mode re-selection parameters broadcast to idle mode mobile devices to cause the idle mobile devices in the imbalance region to re-select a new cell on which to camp. In this regard, the impaired sector carrier with the imbalance region can be used as a downlink-only component carrier while avoiding or reducing the likelihood of idle mode mobile devices camping in a cell in which the uplink is impaired.

For example, in the above-described example in which the average uplink noise reference value is approximately −116 dBm, uplink noise or the uplink average noise is −110 dB, and the uplink service area is 6 dB smaller than the downlink service area (resulting in a 6 db imbalance region), a range reduction alarm can be generated by the uplink noise detecting component 204. In response, the uplink balancing component 206 can adjust the value of one or more re-selection parameters broadcast to idle mode mobile devices such that idle mode mobile devices in the imbalance range re-select to a new cell.

For example, mobile devices in a cell can monitor system information broadcasts (SIBs) that include information identifying neighbor cells and re-selection criterion for the serving cell and the neighbor cell. In some embodiments, the SIBs can include information indicating thresholds that trigger inter-cell re-selection to cause a mobile device in a first cell to then perform handover to or re-select a second cell.

In various embodiments, the re-selection parameters can include, but are not limited to, the absolute signal strength and relative signal strength. For example, absolute signal strength can be a threshold communicated in the information broadcast to the mobile devices to tell the mobile devices to select a certain cell if the absolute signal strength for the cell is greater than a particular value. Because a mobile device in the imbalance region may not detect an absolute signal strength from the BS device for the cell that is higher than the particular value, the mobile device will re-select to a new cell.

As another example, relative signal strength information can include information that causes the mobile device to select a cell having the strongest signal strength at the mobile device.

With reference to FIG. 3, the absolute signal strength information and/or values, relative signal strength information and/or values, information for adjusting the absolute signal strength information, information for adjusting the relative signal strength information and/or the identification of cells and corresponding relative signal strength information can be stored as re-selection parameter information 310 in data storage 300.

Similarly, in some embodiments, the neighboring cell re-selection margins can be adjusted by the uplink noise balancing component 206 to discourage re-selection back towards the impaired cell from the neighboring cell. In this case, the net result is the idle mode service area can be limited to the effective uplink service area only yet the non-impaired downlink resources can be used to or near the cell edge for active mode mobile devices.

The uplink noise detection component 204 can monitor the uplink noise periodically at the same or varying intervals. For example, the uplink noise detection component 204 can monitor the uplink noise after a defined number of minutes, daily or weekly. The time during which the uplink noise is monitored can be defined and/or dynamically updated in the configuration of the uplink noise detection component 204.

In some embodiments, the uplink noise detection component 204 can be configured to monitor the uplink noise upon the occurrence of one or more defined conditions. The defined condition can be a function of any number of different factors. For example, historical information concerning dates or times of day when foreign interference has been detected can inform the uplink noise detection component 204 to trigger uplink noise monitoring. In various embodiments, for example, if foreign interference has been detected after 7 p.m. on weekdays, the uplink noise detection component 204 can utilize such historical information and generate information to cause the uplink noise detection component 204 to monitor uplink noise at the BS device after 7 p.m. on weekdays. Similarly, if foreign interference has been detected during time periods corresponding to heavy traffic patterns in a cell, the uplink noise detection component 204 can utilize such historical information and generate information to cause the uplink noise detection component 204 to monitor uplink noise at the BS device when defined traffic patterns occur (e.g., when defined traffic levels exceed a defined threshold).

If the uplink noise detection component 204 determines that the foreign interference does not exist, the information can be provided to the uplink noise balancing component 206. The uplink noise balancing component 206 can generate information to cause the downlink power from the BS device and/or the re-selection parameter values to be re-adjusted to values prior to the uplink noise detection component 204 determining that the foreign interference existed in the cell. The BS device can then output the adjusted downlink power and/or cause new re-selection parameter values to be broadcast to cause mobile devices that were in the imbalance region in a first cell and that had re-selected to a second cell, to perform handover back to, or re-select back to, the first cell.

The memory 210 can be a computer-readable storage medium storing computer-executable instructions and/or information for performing the functions described herein with reference to the uplink noise balancing system 200. Processor 212 can perform one or more of the functions described herein with reference to the uplink noise balancing system 200.

Figure 4A:
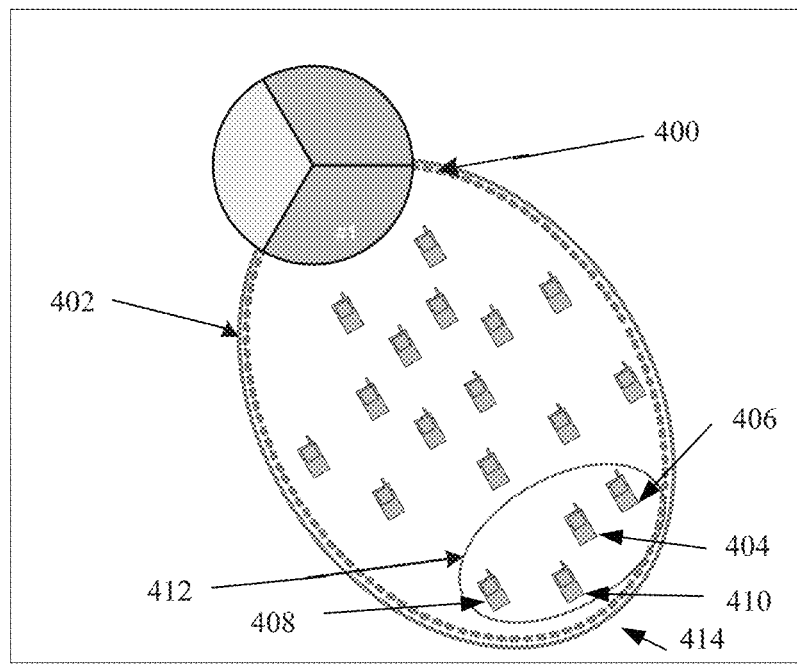
FIG. 4A illustrates an example embodiment of a scenario in which the uplink and downlink paths are balanced and uplink noise balancing is not employed in accordance with embodiments described herein.

FIG. 4A illustrates an example embodiment of a scenario in which the uplink and downlink path are balanced and uplink noise balancing is not employed because no imbalance region exists between the uplink path and the downlink path.

The uplink service area 400 and the downlink service area 402 are effectively matched as shown by the ovals of substantially equal area. As such, no imbalance region exists. Accordingly, mobile devices 404, 406, 408, 410 in a region 412 near the edge 414 of the cell can transmit information on the uplink that can be successfully received by the BS device at a defined reliability.

Figure 4B:
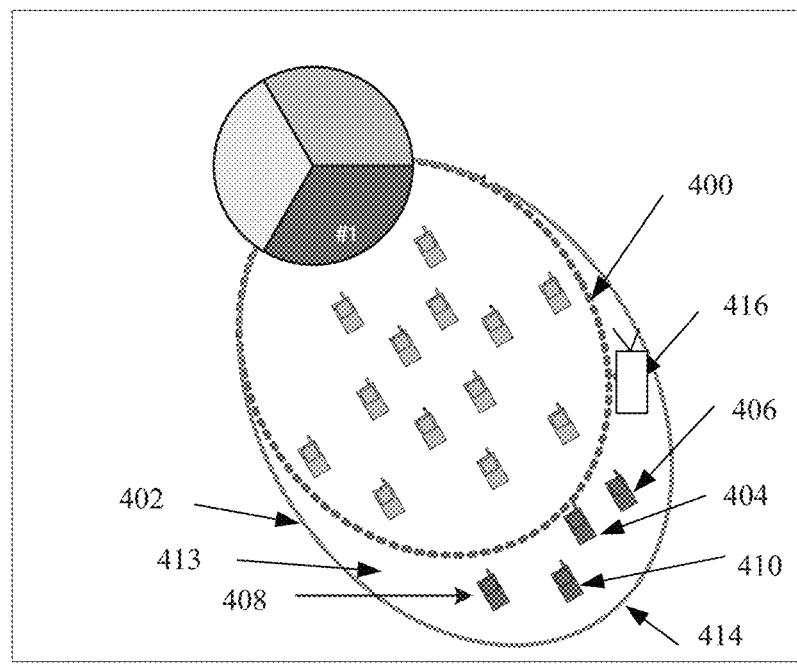
FIG. 4B illustrates an example embodiment of a scenario in which the uplink and downlink paths are imbalanced and uplink noise balancing can be employed in accordance with embodiments described herein.
Figure 4C:
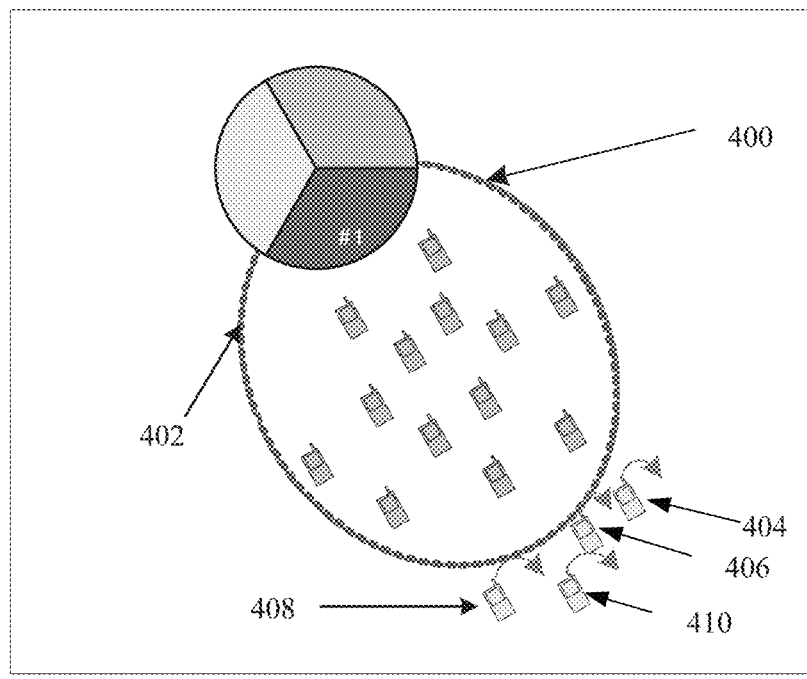
FIG. 4C illustrates an example embodiment of a scenario in which the uplink and downlink paths are balanced employing uplink noise balancing in accordance with embodiments described herein.

FIG. 4B illustrates an example embodiment of a scenario in which the uplink and downlink path are imbalanced in accordance with embodiments described herein. FIG. 4C illustrates an example embodiment of a scenario in which the uplink and downlink path are re-balanced employing uplink noise balancing in accordance with embodiments described herein.

In the scenario shown in FIG. 4B, foreign interference (e.g., from foreign noise source 416) has been detected and an imbalance region 412 exists. The uplink service area 400 is less than the downlink service area 402 as shown by the ovals of different areas thereby resulting in the imbalance region 412. Accordingly, mobile devices 404, 406, 408, 410 in the imbalance region 413 near the edge 414 of the cell may not be able to transmit information on the uplink that can be successfully received by the BS device at a defined reliability. As such, for example, call setup requests may not be received successfully by the BS device.

To perform uplink noise balancing, a determination can be made as to an amount by which the uplink and the downlink are imbalanced, and the downlink power transmitted by the BS device can be reduced to cause the uplink and the downlink power to be substantially equal. As such, the new downlink transmit power from the BS device can cause mobile devices 408, 410, 406, 404 to perform handover to a new cell.

In some embodiments, a determination can be made as to an amount by which to adjust the value of the re-selection parameter (e.g., absolute signal strength or relative signal strength) to cause mobile devices 408, 410, 406, 404 to perform re-selection to a new cell.

Figure 5:
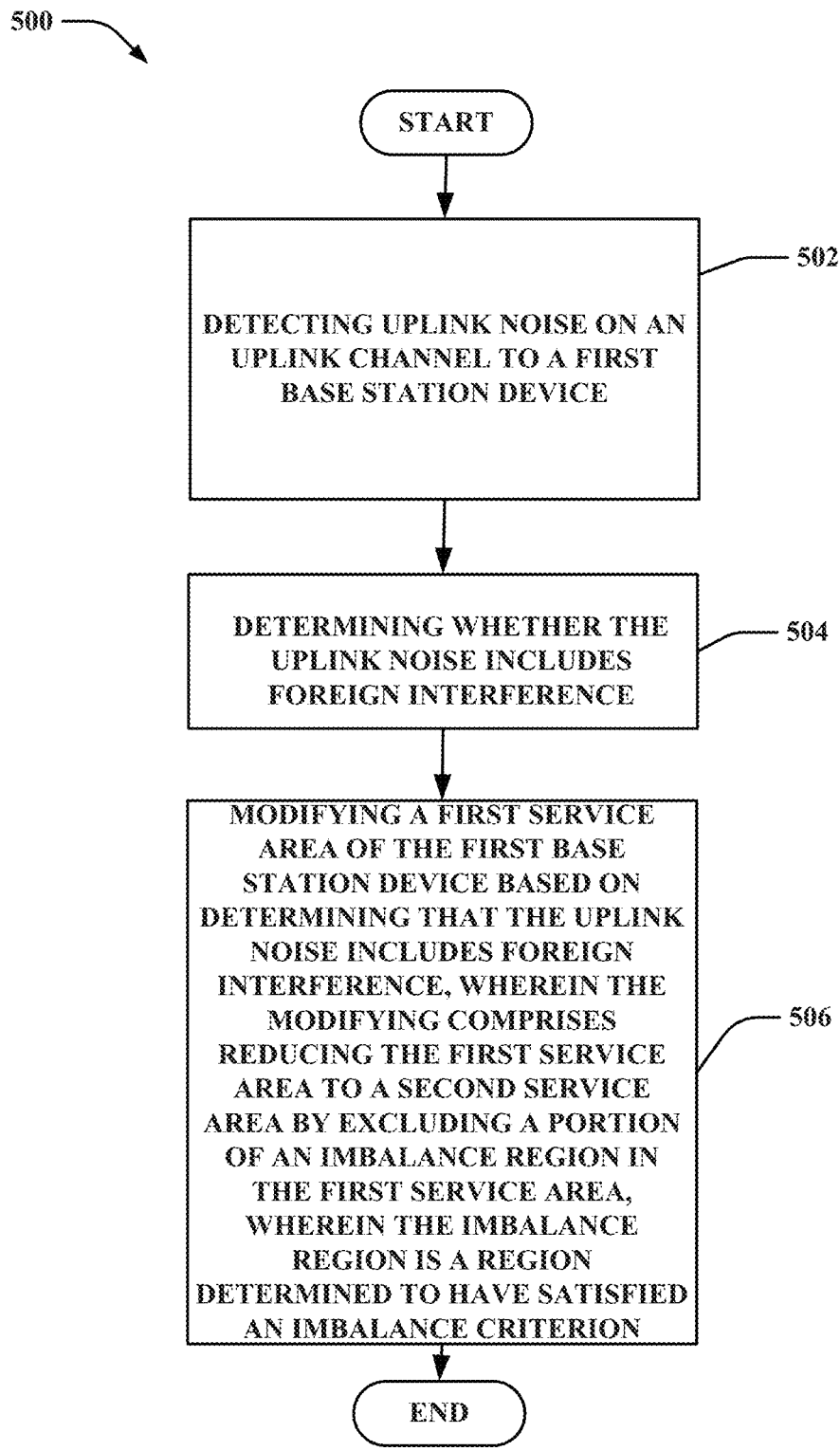
FIGS. 5-8 illustrate example flowcharts of methods that facilitate processing for uplink noise balancing in accordance with embodiments described herein.

FIGS. 5-8 illustrate example flowcharts of methods that facilitate processing for uplink noise balancing in accordance with embodiments described herein. Turning first to FIG. 5, at 502, method 500 can include detecting uplink noise on an uplink channel to a first BS device. At 504, method 500 can include determining whether the uplink noise includes foreign interference, wherein the foreign interference comprises interference from a device that operates outside of a communication system within which the first base station device operates. In some embodiments, determining whether the uplink noise includes foreign interference includes determining whether the uplink noise to the first BS device meets a defined condition.

In some embodiments, the defined condition can be the value of the uplink noise (or average value of the uplink noise) being greater than a defined uplink noise reference value. If the value of the uplink noise (or average value of the uplink noise) is greater than the defined uplink noise reference value, a determination can be made that foreign interference exists (or the effects are at least detected) within the cell associated with the first BS.

In some embodiments, the defined condition can be the uplink noise having such a value as to reduce an uplink service area of the first BS to a region that is less than the downlink service area for the first BS. As a result, an imbalance region can exist in the gap between the uplink service area and the downlink service area.

In some embodiments, the defined condition can be the pattern of uplink noise indicating the presence of foreign interference. For example, in some embodiments, uplink traffic (and corresponding uplink noise) from a mobile device tends to be bursty. For example, a primary type of communication from the mobile device to a BS device is a call setup request, which is intermittent and, as a result, generally results in a single burst of traffic and corresponding noise. As another example, another type of communication from the mobile device to the BS device is a request for data (e.g., request to receive information associated with a webpage). Again, these requests are typically intermittent and result in a burst of traffic and corresponding noise.

While these types of traffic on the uplink typically have a pattern of burstiness, foreign noise sources can exhibit other types of noise patterns detected by the BS device. For example, in the case of analog television sources, the sources tend to have a steady output of noise that can be detected by the BS device for the entire duration of the foreign noise source being powered on. As such, in some embodiments, the BS device can detect the presence of a foreign noise source by determining whether the pattern of uplink noise detected at the BS device is a pattern of steady or fairly constant noise over a defined period of time such as that typically associated with a foreign noise source.

At 506, method 500 can include modifying a first service area of the first BS device based on determining that the uplink noise includes foreign interference, wherein the modifying includes reducing the first service area to a second service area by excluding at least a portion of (or, in some embodiments, the entirety of) an imbalance region in the first service area. In various embodiments, the imbalance region can be a region determined to have satisfied an imbalance criterion.

Figure 6:
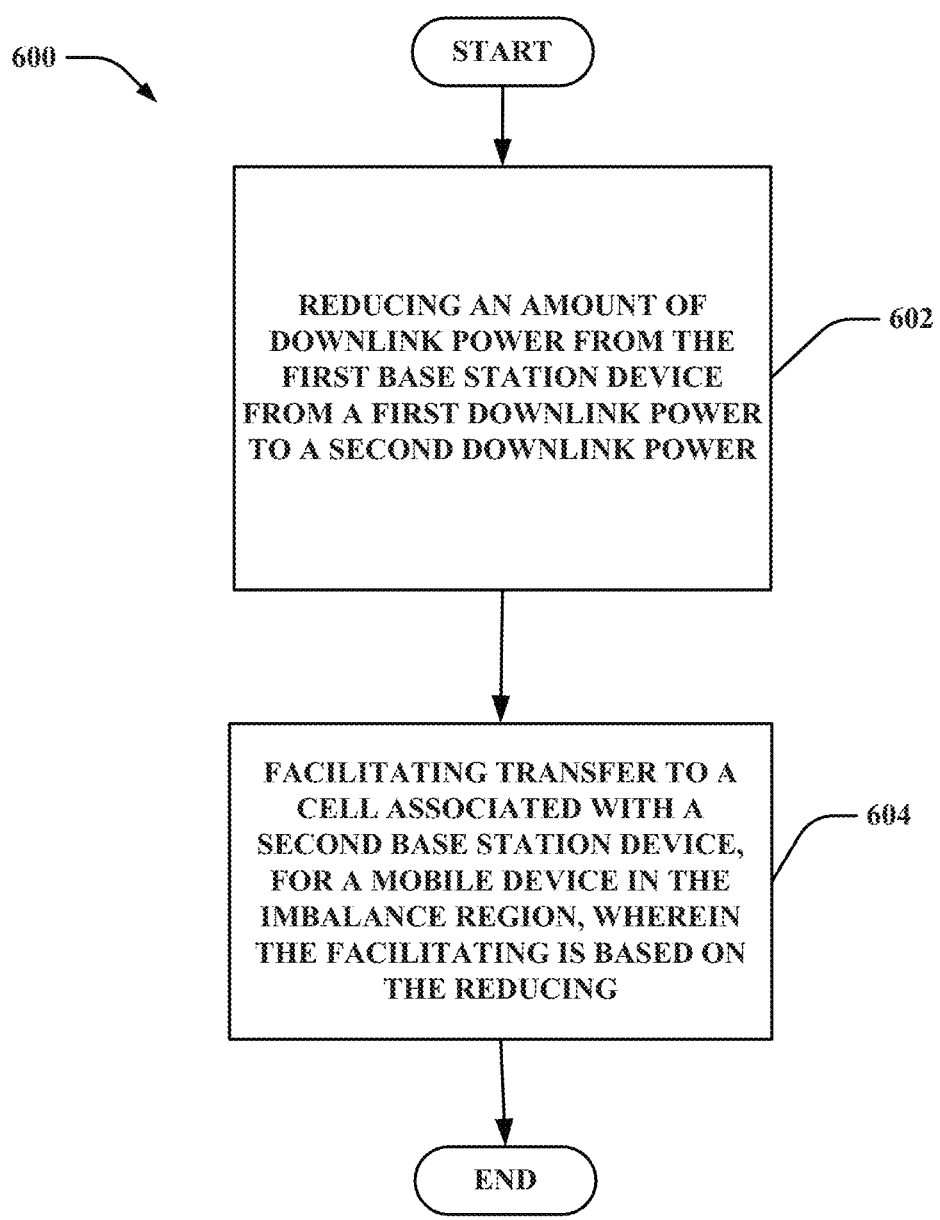

Methods of scaling the service area of the first BS device can be as described with reference to FIGS. 6, 7 and 8. Turning now to FIG. 6, at 602, method 600 can include reducing an amount of downlink power from the first BS device from a first downlink power to a second downlink power. The reduction in downlink power can be based on determining that the uplink noise to the first BS device meets a defined condition.

In some embodiments, the defined condition can be the uplink noise, or average uplink noise, being greater than a defined uplink noise reference value. In some embodiments, the defined condition can be the uplink noise, or average uplink noise, exhibiting a pattern indicative of foreign interference from a foreign noise source.

The second downlink power can be a power that provides communication from the BS device to mobile devices within the reduced, second service area (and that therefore, in some embodiments, does not provide communication to the mobile devices in the imbalance region).

At 604, method 600 can include facilitating transfer to a cell associated with a second BS device, for a mobile device in the imbalance region. The reduced downlink power can cause the mobile devices in the imbalance region to transfer to a new cell in various embodiments. For example, in some embodiments, the downlink power can be reduced such that a mobile device in the imbalance region of the cell associated with the BS device reducing the downlink power no longer receives downlink transmissions from the BS device. In this case, the mobile device can then perform handover to or re-select a new cell (e.g., cell 110 associated with BS device 106 of FIG. 1).

Figure 7:
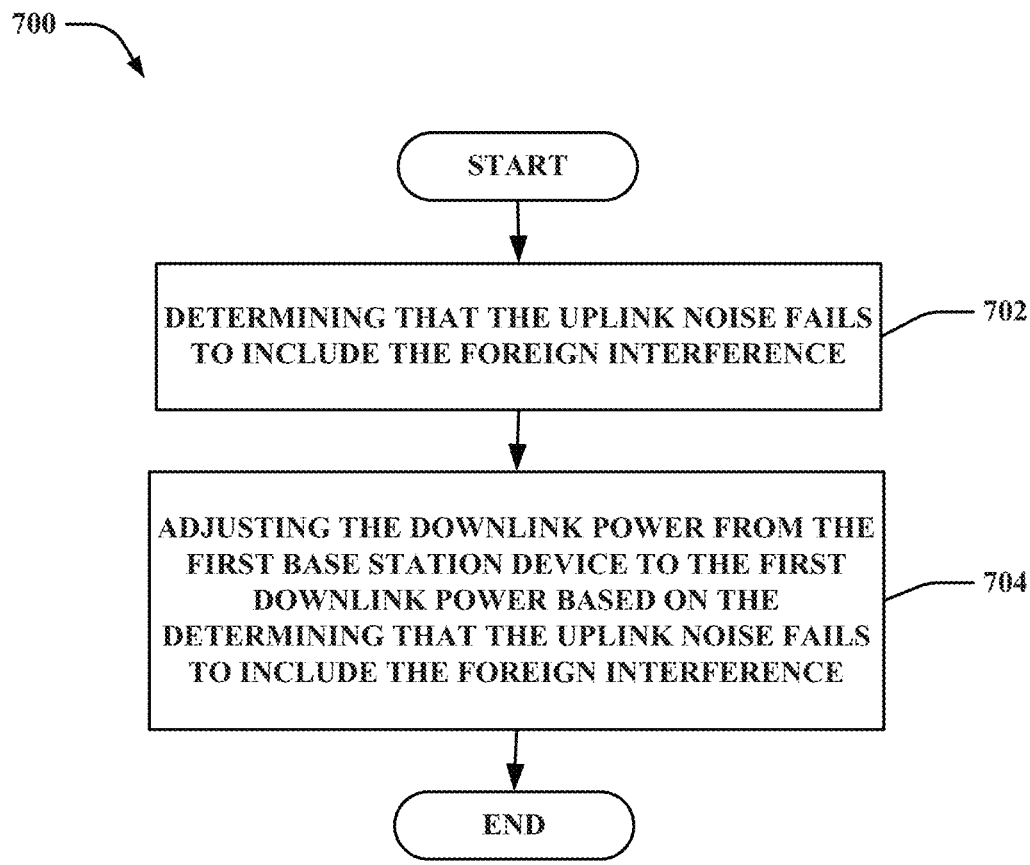

Turning now to FIG. 7, at 702, method 700 can include determining that the uplink noise fails to include the foreign interference. In various embodiments, the foreign interference can be generated by sources including, but not limited to, analog televisions and/or systems, broadcast video systems, faulty cable television systems, faulty fluorescent lighting components, wireless microphones, co-located high power 1900 MHz transmitters, 850 MHz transmitters, AWS transmitters and/or 700 MHz transmitters.

In some embodiments, a determination can be made based on whether the average uplink noise detected at the BS device is less than a defined reference value associated with the presence of a foreign noise source and/or based on whether the pattern of uplink noise detected at the BS device no longer indicates the presence of a foreign noise source. For example, the pattern can indicate bursty traffic on the uplink to the BS device as opposed to uplink noise over a defined amount of time (e.g., 10 minutes).

At 704, method 700 can include adjusting the downlink power from the first BS device to the first downlink power based on the determining that the uplink noise fails to include the foreign interference. For example, if the uplink noise no longer includes the foreign interference, the downlink power can be re-adjusted to the value of the first downlink power or to a value that is higher than the value of the reduced, second downlink power.

In embodiments in which the downlink power is re-adjusted to the value of the first downlink power, the service area for the BS device can correspondingly increase back to the original service area (e.g., the service area covered by the entire cell associated with the BS device). In embodiments in which the downlink power is re-adjusted to the value that is between the first downlink power and the second downlink power, the service area for the BS device can correspondingly increase from a service area between the size of the original service and the size of the second, reduced service area.

Figure 8:
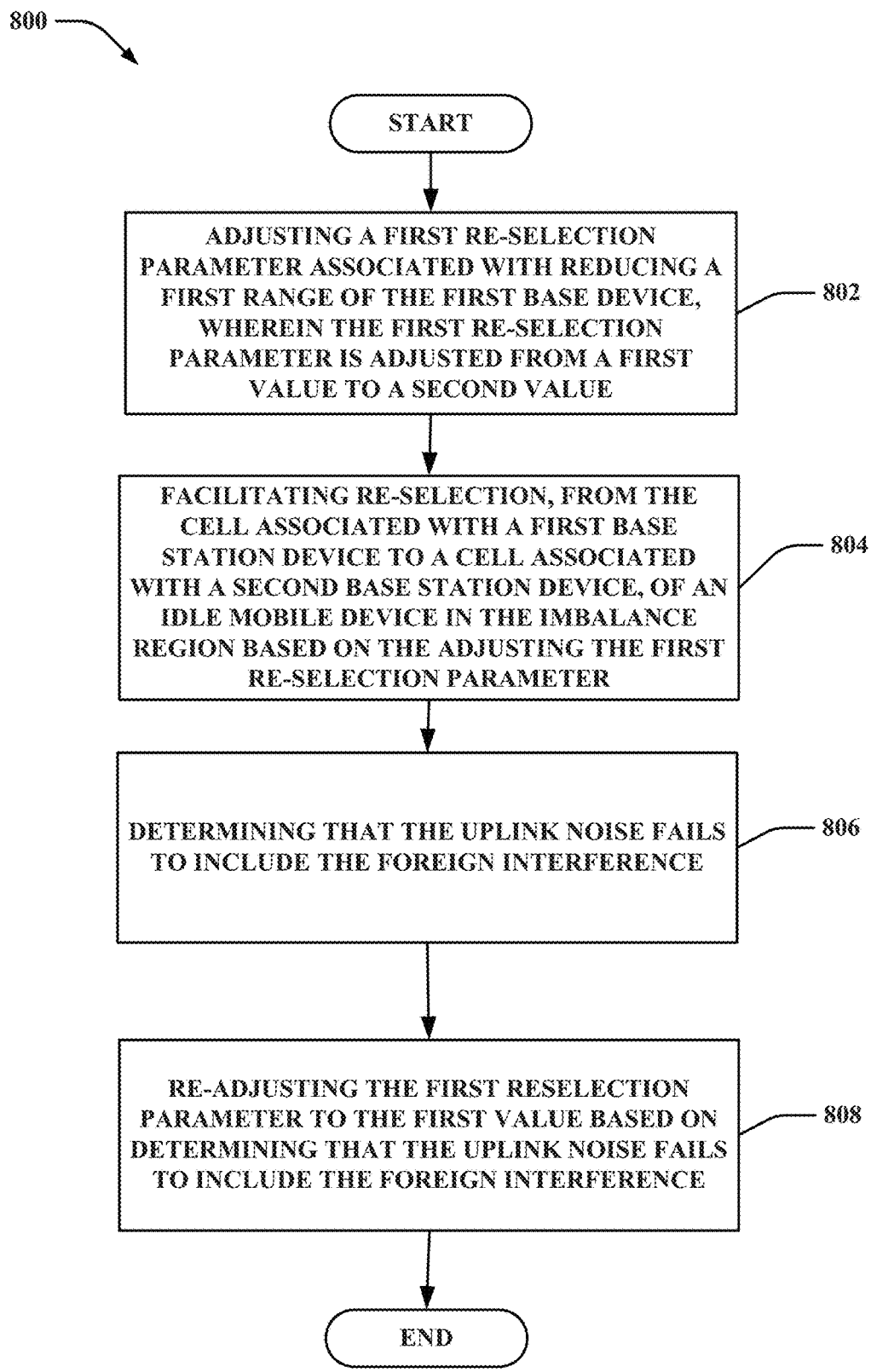

Turning now to FIG. 8, at 802, method 800 can include adjusting a first re-selection parameter associated with reducing a first range of the first BS device, wherein the first re-selection parameter is adjusted from a first value to a second value. For example, mobile devices in a cell can monitor SIB s that include information identifying neighbor cells and re-selection criterion for the serving cell and the neighbor cell. In some embodiments, the SIBs can include information indicating thresholds that trigger inter-cell re-selection to cause a mobile device in a first cell to then perform handover to or re-select a second cell.

In various embodiments, the first re-selection parameter can include absolute or relative signal strength. For example, the signal strength that causes a mobile device to bind to or leave a cell can be a re-selection parameter value that is changed. In particular, the absolute signal strength (or relative signal strength) can be a threshold value in the SIB received by the mobile devices that tell the mobile devices to then perform handover to or re-select a second cell and thereby move from a first cell if the absolute signal strength for the second cell is greater than a particular value.

As another example, the relative signal strength can be information that tells the mobile device to then perform handover to or re-select a second cell and thereby move from a first cell if the relative signal strength between the first cell and the second cell indicates that the second cell has a stronger received signal at the mobile device. Accordingly, in some embodiments, with the change in parameter, the idle mobile devices camping on a first cell associated with a first BS device can be shifted to a second cell associated with a second BS device, for example.

At 804, method 800 can include facilitating re-selection from the first BS device, wherein the transfer is performed by a mobile device in the imbalance region based on adjusting the first re-selection parameter. Based on the downlink power from the BS device and/or based on the first re-selection parameter transmitted by the BS device, the uplink noise balancing system can facilitate the re-selection of the mobile device in the imbalance region from a first cell to a second cell.

At 806, method 800 can include determining that the uplink noise fails to include the foreign interference. At 808, method 800 can include re-adjusting the first re-selection parameter to the first value based on determining that the uplink noise fails to include the foreign interference.

Figure 9:
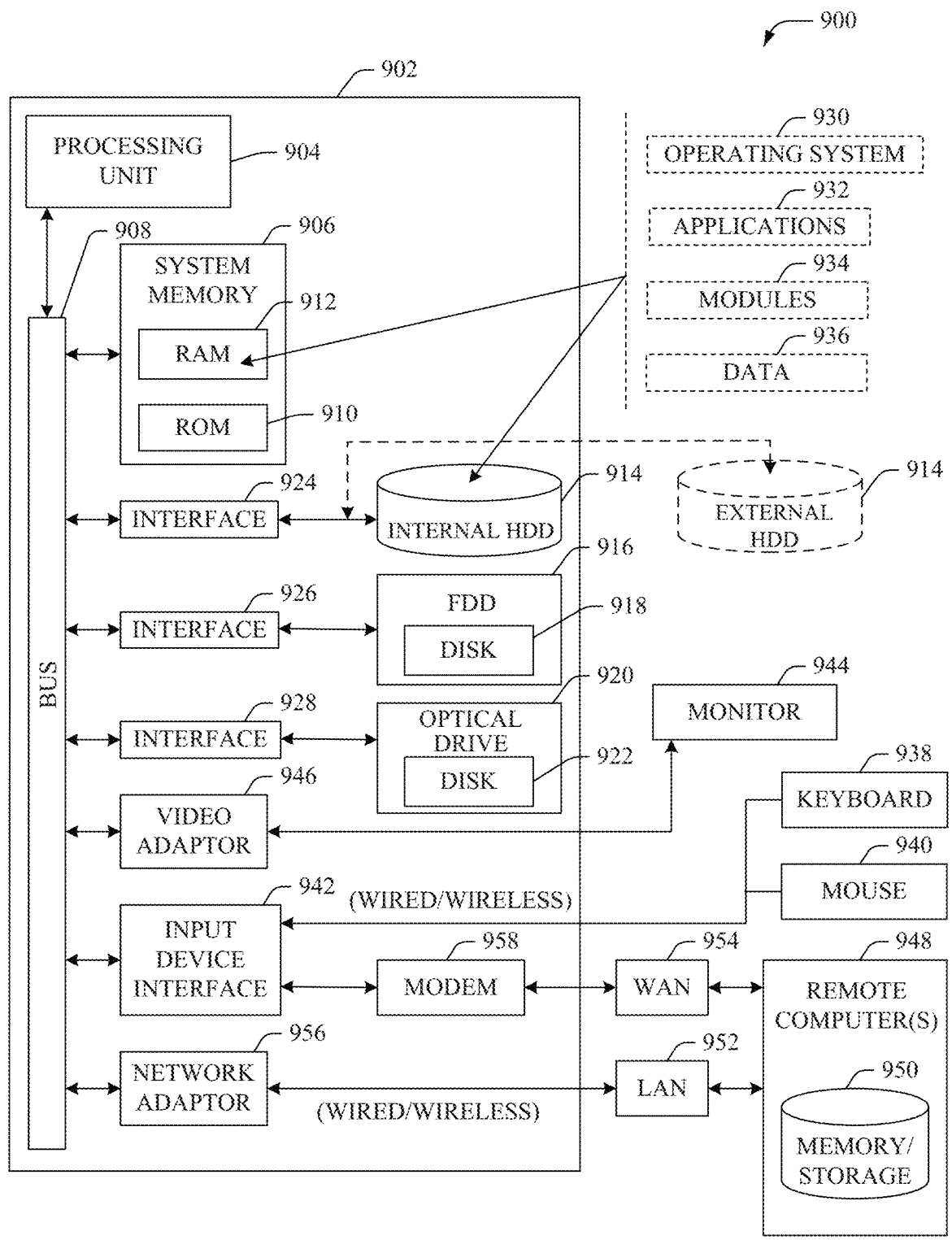
FIG. 9 illustrates a block diagram of a computer operable to facilitate processing for uplink noise balancing in accordance with embodiments described herein.

Referring now to FIG. 9, there is illustrated a block diagram of a computer operable to facilitate uplink noise balancing. For example, in some embodiments, the computer can be or be included within the uplink noise balancing system 102, 200.

In order to provide additional context for various embodiments of the embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. Further, the phrase "facilitates execution by a processor" as used herein can mean "execution or facilitating execution" by the processor, e.g., the processor can be carrying out an action, such as when processing data directly, or helping to carry out an action, such as when data is displayed, or transmitted.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the embodiments described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive 914, which internal hard disk drive 914 can also be configured for external use in a suitable chassis (not shown), a magnetic floppy disk drive 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A mobile device can enter commands and information into the computer 902 through one or more wired/wireless input devices, e.g., a keyboard 938 and a pointing device, such as a mouse 940. Other input devices (not shown) can include a microphone, an infrared remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a USB port, an infrared interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a BS device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The embodiments described herein can employ artificial intelligence to facilitate automating one or more features described herein. The embodiments (e.g., in connection with automatically identifying acquired cell sites that provide a maximum value/benefit after addition to an existing communication network) can employ various artificial intelligence-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a mobile device desires to be automatically performed. A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, support vector machines can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor, a field programmable gate array, a programmable logic controller, a complex programmable logic device, a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include ROM, programmable ROM, electrically programmable ROM EEPROM or flash memory. Volatile memory can include RAM, which acts as external cache memory. By way of illustration and not limitation, RAM is available in many forms such as static RAM, dynamic RAM, synchronous, dynamic RAM, double data rate synchronous dynamic RAM, enhanced synchronous dynamic RAM, Synchlink dynamic RAM, and direct RAM. The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine-readable medium, comprising executable instructions that, when executed by a processor, facilitate performance of operations, comprising:
    detecting an uplink noise on an uplink channel of a first base station, wherein a defined type of external interference determined to be impacting operation of the first base station comprises interference from a device that operates outside of a communication system within which the first base station operates; and
    modifying a first service area of the first base station based on an outcome of determining whether the uplink noise comprises the defined type of external interference, wherein the modifying comprises reducing the first service area to a second service area by excluding a portion of an imbalance region in the first service area, wherein the imbalance region comprises a defined area of the first service area from which first communications from the first base station are determined to be reliably received according to a reliability criterion and second communications to the first base station from the defined area are determined not to be reliably received by the first base station according to the reliability criterion.

2. The non-transitory machine-readable medium of claim 1, wherein the imbalance region is a region determined to have become imbalanced as a result of the foreign interference based on an evaluation of an imbalance criterion.

3. The non-transitory machine-readable medium of claim 2, wherein the imbalance region is determined to be located at a region between an uplink service area and a downlink service area.

4. The non-transitory machine-readable medium of claim 1, wherein the modifying comprises:
    reducing an amount of downlink power transmitted from the first base station from a first downlink power to a second downlink power.

5. The non-transitory machine-readable medium of claim 4, wherein the operations further comprise:
    as a result of the first downlink power being reduced to the second downlink power, facilitating a transfer of a mobile device in the imbalance region to a cell device associated with a second base station.

6. The non-transitory machine-readable medium of claim 1, wherein the modifying comprises:
    changing a re-selection parameter associated with changing a transmission range of the first base station.

7. The non-transitory machine-readable medium of claim 1, wherein a source of the external interference by the device comprises an analog signal.

8. A method, comprising:
    detecting, by network equipment comprising a processor, an uplink noise on an uplink channel of a first base station, wherein a defined type of external interference determined to be impacting operation of the first base station comprises interference from a device that operates outside of a communication system within which the first base station operates; and
    modifying, by the network equipment, a first service area of the first base station based on an outcome of determining whether the uplink noise comprises the defined type of external interference, wherein the modifying comprises reducing the first service area to a second service area by excluding a portion of an imbalance region in the first service area, wherein the imbalance region comprises a defined area of the first service area from which first communications from the first base station are determined to be reliably received according to a reliability criterion and second communications to the first base station from the defined area are determined not to be reliably received by the first base station according to the reliability criterion.

9. The method of claim 8, wherein the modifying comprises decreasing a first size of the first service area to a second size of a second service area smaller than the first size by removing a portion of an imbalance region in the first service area.

10. The method of claim 9, wherein the imbalance region is determined to be located at a region between an uplink service area and a downlink service area.

11. The method of claim 8, wherein the modifying comprises:
    reducing an amount of downlink power transmitted from the first base station from a first downlink power to a second downlink power.

12. The method of claim 11, further comprising:
as a result of the first downlink power being reduced to the second downlink power, facilitating, by the network equipment, a transfer of a mobile device in the imbalance region to a cell device associated with a second base station.

13. The method of claim 8, wherein the modifying comprises:
changing a re-selection parameter associated with changing a transmission range of the first base station.

14. The method of claim 8, wherein a source of the external interference by the device comprises an analog signal.

15. A system, comprising:
a processor; and
a memory that stores executable instructions that, when executed by the processor, facilitate performance of operations, comprising:
detect an uplink noise on an uplink channel of a first base station, wherein a defined type of external interference determined to be impacting operation of the first base station comprises interference from a device that operates outside of a communication network within which the first base station operates; and
modify a first service area of the first base station based on an outcome of determining whether the uplink noise comprises the defined type of external interference, wherein modification comprises reduction of the first service area to a second service area by excluding a portion of an imbalance region in the first service area, wherein the imbalance region comprises a defined area of the first service area from which first communications from the first base station are determined to be reliably received and second communications to the first base station from the defined area are determined to not be reliably received by the first base station.

16. The system of claim 15, wherein modification of the first service area comprises a decrease in a first size of the first service area to a second size of a second service area smaller than the first size by removal of a portion of an imbalance region in the first service area.

17. The system of claim 16, wherein the imbalance region is determined to be located at a region between an uplink service area and a downlink service area.

18. The system of claim 15, wherein modification of the first service area comprises:
a reduction of an amount of downlink power transmitted from the first base station from a first downlink power to a second downlink power.

19. The system of claim 18, wherein the operations further comprise:
as a result of the first downlink power being reduced to the second downlink power, facilitating a handover of a mobile device in the imbalance region to a cell device associated with a second base station.

20. The system of claim 15, wherein the imbalance region is determined to be located at a region between an uplink service area and a downlink service area.

* * * * *